Sept. 6, 1927.  W. H. BENNETT  1,641,877
VEHICLE BODY
Filed Nov. 16, 1926     2 Sheets-Sheet 1
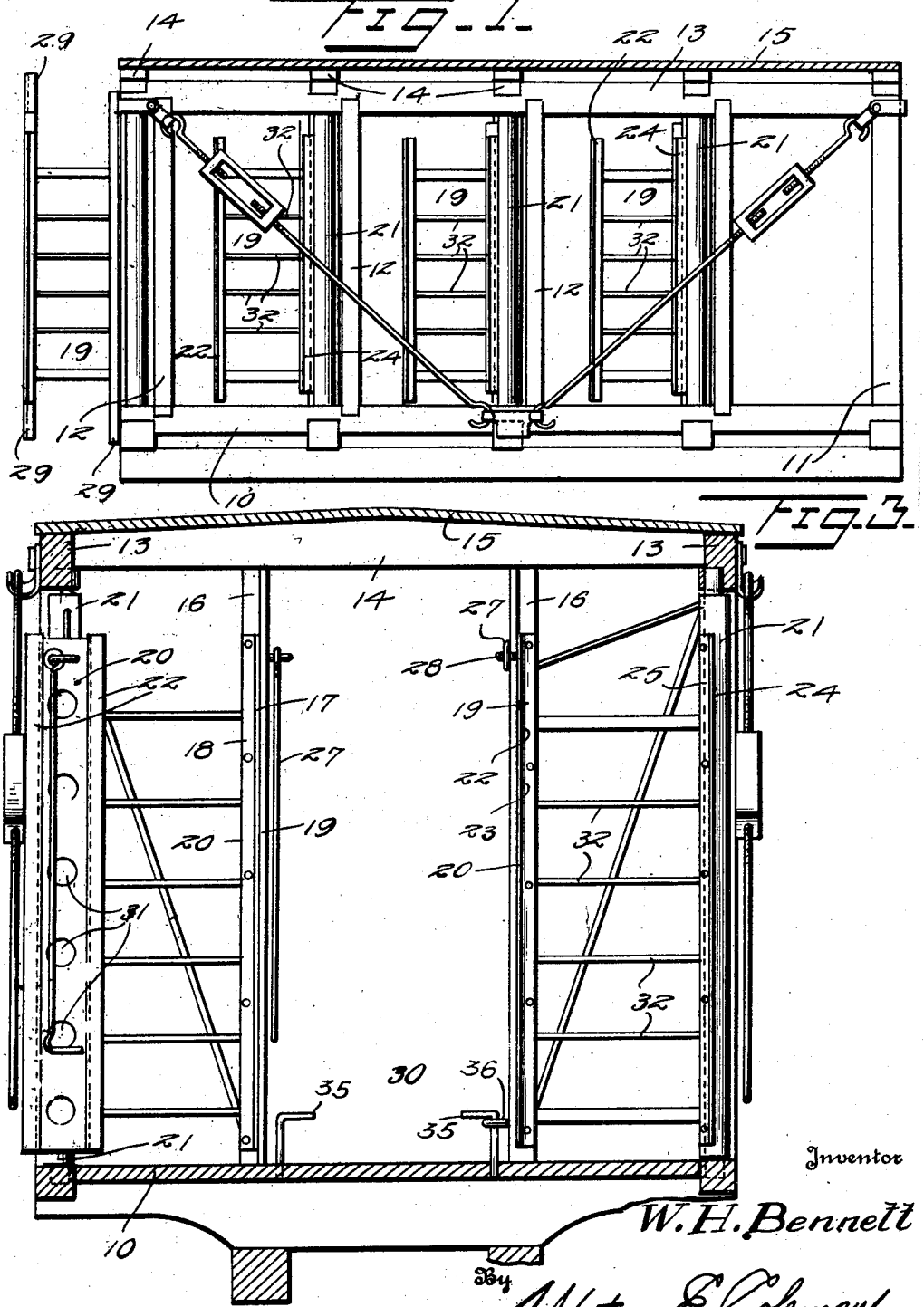
Inventor
W. H. Bennett
By Watson E. Coleman
Attorney

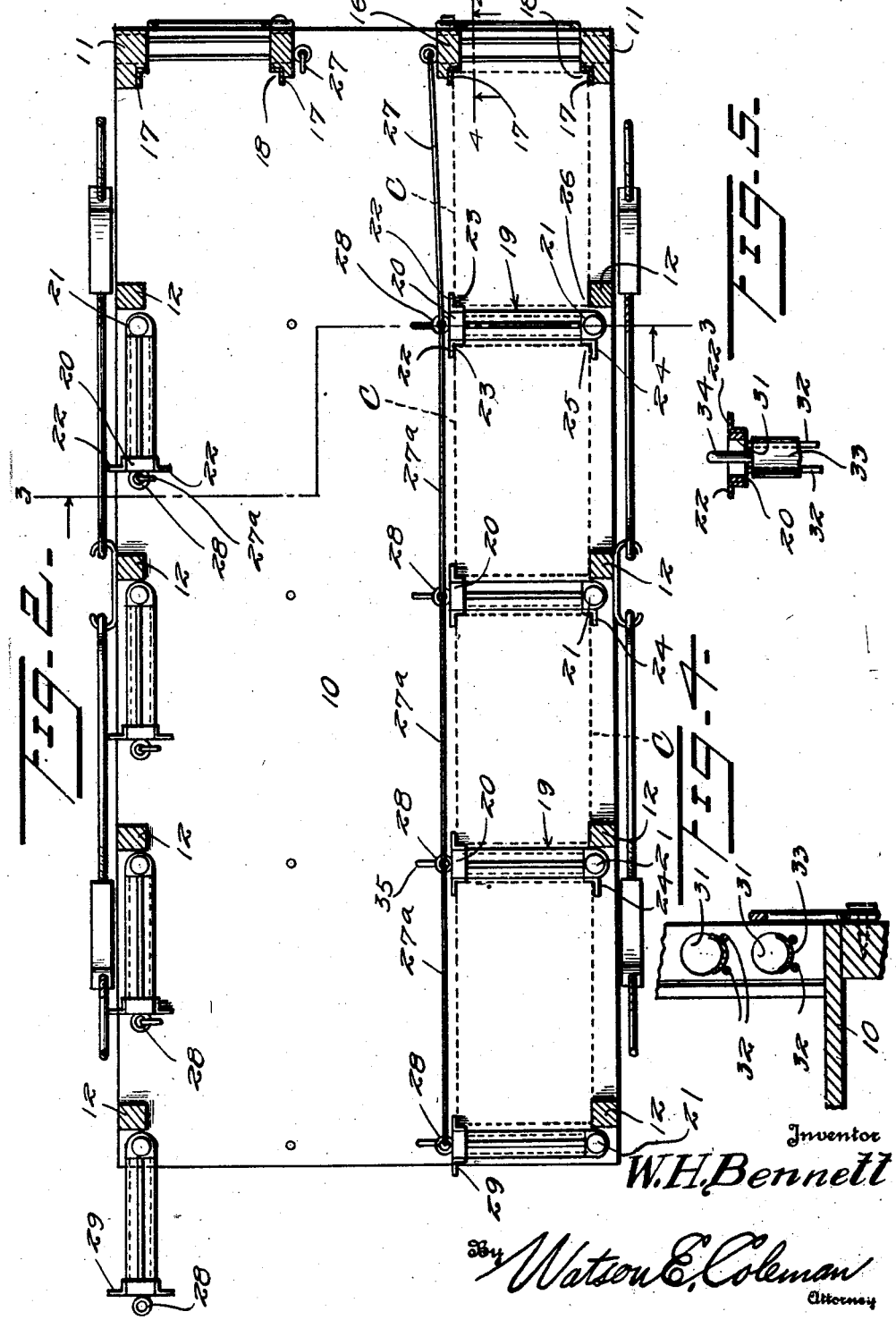

Patented Sept. 6, 1927.

1,641,877

UNITED STATES PATENT OFFICE.

WILLIAM H. BENNETT, OF CALVIN, OKLAHOMA.

VEHICLE BODY.

Application filed November 16, 1926. Serial No. 148,712.

This invention relates to vehicle bodies and more particularly to a vehicle body for use in the transportation of live poultry in coops.

An important object of the invention is to provide a body in which a number of coops may be conveniently and readily stored and in which the coops are securely retained in position against shifting movements while the vehicle is in motion.

A further object of the invention is to provide a structure which facilitates feeding and caring for the fowls during transportation.

A still further object of the invention is to provide a construction of this character which may be readily and comparatively cheaply produced, which will be durable and efficient in service and a general improvement in the art.

These and other objects I attain by the construction shown in the accompanying drawings, wherein for the purpose of illustration is shown a preferred embodiment of my invention and wherein:—

Figure 1 is a side elevation partially sectional showing a vehicle body constructed in accordance with my invention;

Figure 2 is an enlarged horizontal sectional view taken therethrough;

Figure 3 is a section on the line 3—3 of Figure 2;

Figure 4 is a section on the line 4—4 of Figure 2;

Figure 5 is a transverse sectional view through the free edge bar of a gate structure showing the manner in which the feeding troughs may be removed or inserted.

Referring now more particularly to the drawings, the numeral 10 indicates a base of any suitable character and which may be constructed either for application to a truck or truck and trailer, as desired. Arising from this base at the forward corners thereof are vertical standards 11 and similar standards 12 are spaced longitudinally of the sides of the base. These standards combine to support longitudinal top sills 13 which are preferably connected at spaced intervals by carlines 14 providing a support for a roof structure 15. The forward carline 14 is connected with the forward edge of the base structure by vertically extending standards 16 transversely spaced from one another and from the adjacent corner standard 11. The rear faces of the standards 11 and 16 are provided with angle iron guides 17 which provide upon each standard 11 and the adjacent standard 16 vertically extending channels 18 adapted to receive the corners of a tier of coops C placed thereagainst. The standards 11 are so spaced from the standards 12 that one side of the coop tier at a further corner thereof abuts against the adjacent standards 12 and is held in position thereby.

Pivoted to the base at their lower ends and to the sills 13 at their upper ends are gates, generally designated at 19. Each gate preferably includes vertically extending bars 20 and 21 arranged at the free and hinged edges thereof respectively. The bar 20 has at opposite side faces thereof vertically extending angles irons 22 each forming a vertically extending channel 23 receiving a corner of a coop tier. The bar 21 has at the face thereof remote from the adjacent standard 12 an angle iron 24 providing a further channel 25 for the reception of the corner of a coop tier. The face of the bar 21 combines with the adjacent standard 12 to provide a channel 26 receiving the corner of a coop tier.

Each standard 16 has pivoted thereto adjacent its upper end one end of a bar 27, the opposite end of which is formed with a hook for engagement in an eye 28 secured to the upper end of the bar 20 of the adjacent gate. Pivoted to the upper end of each gate, preferably by the eye 28 of the gate is a similar bar 27ᵃ, the free end of which is provided with a hook for engagement in the eye 28 of an adjacent gate. It will be obvious that by folding the gates against the sides of the structure and placing a tier of the crates C with their corners in the channels 18 and then swinging the first gate into position, this tier of crates will be locked in position. The gate being locked by the hook 27 will then present a structure similar to the structure presented by the standards 11 and 16 for the reception of the corners of a second tier. The gate, when locked in position, engages the first tier in its channel 23 and in the channel 26 formed by the gate with the standard 12, so that the tier is firmly held against movement. By successively placing tiers of crates in position and swinging the gates to the tier retaining positions, the truck body can be entirely filled with the crates and all of the crates will be held against movement. The endmost gates 19 preferably have at their upper and lower ends stops 29 engaging the rear carline and rear end of the base, respectively, to limit the forward movement of the free edges of these gates upon the body.

In order to provide for feeding the fowls during transportation, the free edges of the gates and of the tiers of crates retained in position thereby are left spaced from one another to provide a central aisle 30 and the vertical bar of each gate is formed with openings 31 vertically spaced from one another a distance equal to the depth of the ordinary poultry crate. Connecting the bars 20 and 21 beneath the level of each opening are transversely extending elements 32 which preferably not only serve as a means for supporting the feed troughs 33 inserted through the openings 31, but likewise serve to connect the gate elements. The troughs 33 are preferably provided with handles 34 extending beyond the outer faces of the bars 20, so that they are readily accessible for removal when they must be cleaned or replenished.

It will be obvious that while I have hereinbefore described the channels as produced by the application of the angle irons to the bars 20 and 21 and standards 16 and 11, these channels might be produced in the formation of these elements and made an inherent part of the structure. Suitable means, such as bolts 35 directed through eyes 36 carried by the gate and engaging in openings formed in the base, may be employed for retaining the gates of each series in either parallel or aligned relation.

Other changes being possible in the construction without in any manner departing from the spirit of the invention, I do not limit myself to such specific structure except as hereinafter claimed.

I claim:—

1. In a device for transporting poultry in crates, a base, a plurality of gates pivoted to the base and each having at its free edge at opposite side faces thereof vertically extending channels adapted to receive a corner of a tier of coops, the hinged edge of the gate having upon one side face thereof a vertically extending channel adapted to receive a corner of a tier of coops and a vertical abutment adjacent the opposite side of the hinged edge of the gate and combining with the last named side of the hinged edge of the gate when in one position to provide a channel for the reception of a corner of a tier of coops.

2. In a device for transporting poultry in crates, a base, a plurality of gates pivoted to the base and each having at its free edge at opposite side faces thereof vertically extending channels adapted to receive a corner of a tier of coops, the hinged edge of the gate having upon one side face thereof a vertically extending channel adapted to receive a corner of a tier of coops, a vertical abutment adjacent the opposite side of the hinged edge of the gate and combining with the last named side of the hinged edge of the gate when in one position to provide a channel for the reception of a corner of a tier of coops, the free edge of the gate having vertically spaced openings directed transversely of the gate, said openings being spaced apart a distance equal to the height of a coop and means carried by the gate for supporting feed troughs inserted through said openings.

3. In a device for transporting poultry in crates; a base, a plurality of gates pivoted to the base and each having at its free edge at opposite side faces thereof vertically extending channels adapted to receive a corner of a tier of coops, the hinged edge of the gate having upon one side face thereof a vertically extending channel adapted to receive a corner of a tier of coops, a vertical abutment adjacent the opposite side of the hinged edge of the gate and combining with the last named side of the hinged edge of the gate when in one position to provide a channel for the reception of a corner of a tier of coops and means for connecting the gates to one another when the gates are in parallel relation.

4. In a device for transporting poultry in crates, a base, an end structure arising from the base at one end thereof, a plurality of gates pivoted to the base and swingable to positions where they parallel the end structure, the inner face of the end structure and corresponding faces of the gates having means associated therewith engaging the corners of one end of tiers of coops to prevent movement of the coops transversely of the base and means associated with the opposite faces of the gates for similarly engaging the corners of the opposite ends of the tiers of coops when the gates are in said position.

5. In a device for transporting poultry in crates, a base, an end structure arising from the base at one end thereof, a plurality of gates pivoted to the base and swingable to positions where they parallel the end structure, the inner face of the end structure and corresponding faces of the gates having means associated therewith engaging opposite corners of one end of tiers of coops to prevent movement of the coops transversely of the base, means associated with the opposite faces of the gates for similarly engaging the opposite ends of the tiers of coops when the gates are in said position, means for connecting the gates in series when in said position and means for connecting the end structure and the gate next adjacent thereto.

6. In a device for transporting poultry in crates, a base, an end structure arising from the base at one end thereof, a pair of transversely spaced series of pivoted gates carried by the base, said gates being swingable about the pivots thereof from positions where they leave the base substantially unobstructed to positions where they parallel the end structure leaving an aisle therebetween, the inner face of said end structure and corresponding faces of the gates of each series being each provided with means for engaging one end of a tier of coops to prevent movement of the coops transversely of the base and means associated with the opposite face of each gate for similarly engaging the opposite ends of the tiers of coops when the gates are in said position, the aisle fronting faces of the gates each having a series of vertically spaced openings therein, each gate having means associated with the openings thereof for supporting feed troughs.

7. A structure as claimed in claim 4, wherein each gate embodies means for supporting a feed trough in alignment with each coop of the tier engaged thereby.

8. A structure as claimed in claim 4, wherein the gates embody means for supporting between adjacent faces of the coops the tiers engaged thereby and in alignment with each coop of each tier a feed trough, corresponding ends of the gates having openings through which said feed troughs may be inserted and removed.

In testimony whereof I hereunto affix my signature.

WILLIAM H. BENNETT.